March 31, 1970 F. CANOVA 3,503,479
CONTROL APPARATUS AND METHOD FOR ROTATING ELEMENTS
Filed April 9, 1968

INVENTOR
FRED CANOVA
ATTORNEY

United States Patent Office 3,503,479
Patented Mar. 31, 1970

3,503,479
CONTROL APPARATUS AND METHOD FOR ROTATING ELEMENTS
Fred Canova, Phillipsburg, N.J., assignor to Ingersoll-Rand Company, New York, N.Y., a corporation of New Jersey
Filed Apr. 9, 1968, Ser. No. 719,956
Int. Cl. F16d *43/04;* H02p *3/02;* H01h *35/40*
U.S. Cl. 192—103
9 Claims

ABSTRACT OF THE DISCLOSURE

An apparatus for controlling the rotation of a rotating element, employing a pulsating fluid signal variable in frequency in response to variations in the rotary speed of the rotating element. The fluid signal is directed onto a flexible actuating element which, upon a predetermined frequency of the fluid signal, oscillates through a predetermined large amplitude to actuate a low pressure switch to stop rotation of the rotating element. Also, a method for controlling the rotation of a rotating element through the employment of such a control apparatus.

BACKGROUND OF THE INVENTION

The present invention relates to apparatus and methods for controlling the rotation of rotating elements of rotary machinery such as, by way of example only, rotary pumps, turbines, compressors, and the like.

Conventionally, rotary machinery is frequently provided with a shaft speed control device, commonly called an overspeed trip, adapted to be automatically actuated in the event that the shaft exceeds a predetermined rotary speed. This speed sensing device normally must be sufficiently powered and suitably connected to stop rotation of the shaft upon its actuation, and must, of course, be powered in such a manner that it does not adversely affect the overall reliability of the machinery. Thus, for example, such a device for a steam turbine cannot be electrically powered as in the event of an electrical power failure it would unnecessarily stop the operation of the turbine.

Therefore, conventional devices for this purpose generally comprise a spring loaded eccentric weight (usually a bolt) mounted in an opening in the rotating shaft such that, when the rotary speed of the rotating shaft exceeds the predetermined rotary speed, centrifugal force moves the weight against the spring to cause the weight to trip a lever and thereby stop the machine. These conventional devices are, however, undesirable in that they are large in size and necessitate the formation of a correspondingly large opening in the shaft. This large opening significantly reduces the torque carrying capacity of the shaft and usually has been limited in application to a shaft outboard of the bearing and not carrying high torque. Moreover, these conventional devices are extremely sensitive to manufacturing and material tolerances and, due to their extreme sensitivity, must be generally adjusted experimentally on a trial-and-error basis for each machine. In addition, as the devices are generally operated in an oil laden atmosphere, they must be formed to prevent their operation from causing sparks; and, as after only a relatively few operations distortion of the weight or bolt is common, it must be frequently replaced.

SUMMARY OF THE INVENTION

An object of the present invention is to provide a new and improved, fluid operated apparatus for controlling the rotation of a rotating element such as, by way of example, a rotating shaft of machinery such as rotary pumps, turbines, compressors, and the like.

Another object of the invention is to provide a new and improved, fluid operated control apparatus of the type set forth which is particularly constructed and arranged to overcome the aforementioned defects and disadvantages of conventional devices for its purpose.

Another object is to provide a new and improved method for controlling the rotation of a rotating element through the employment of such a control apparatus.

In accordance with the present invention, a control apparatus is provided for a rotating element which has deformations spaced circumferentially therearound. This control apparatus generally considered comprises fluid supply means for directing pressurized fluid on said deformations and providing a pulsating fluid signal variable in frequency in response to variations in the rotary speed of the rotating element, an actuating element in the path of said fluid signal and oscillatable by a predetermined frequency of the latter through a predetermined amplitude, pressure operated means actuatable for controlling the rotation of the rotating element, and conduit means for supplying pressurized fluid to the controlling means, such conduit means being arranged whereby the actuating element interferes with the flow of fluid through the conduit means to thereby actuate the controlling means upon movement of the actuating element through the aforesaid predetermined amplitude.

In accordance with the presence invention, moreover, the rotation of the rotating element may be controlled by the method wherein pressurized fluid is directed onto said deformations to provide a pulsating fluid signal variable in frequency in response to variations in the rotary speed of the rotating element, the fluid signal is directed onto an actuating element which is oscillatable through a predetermined amplitude by a predetermined frequency of the fluid signal, and the movement of the actuating element through the predetermined amplitude is employed to interfere with fluid flow to a pressure operated controlling means whereby the controlling means is thereby actuated for control of such rotation.

DESCRIPTION OF THE PREFERRED EMBODIMENT

Figure 2:
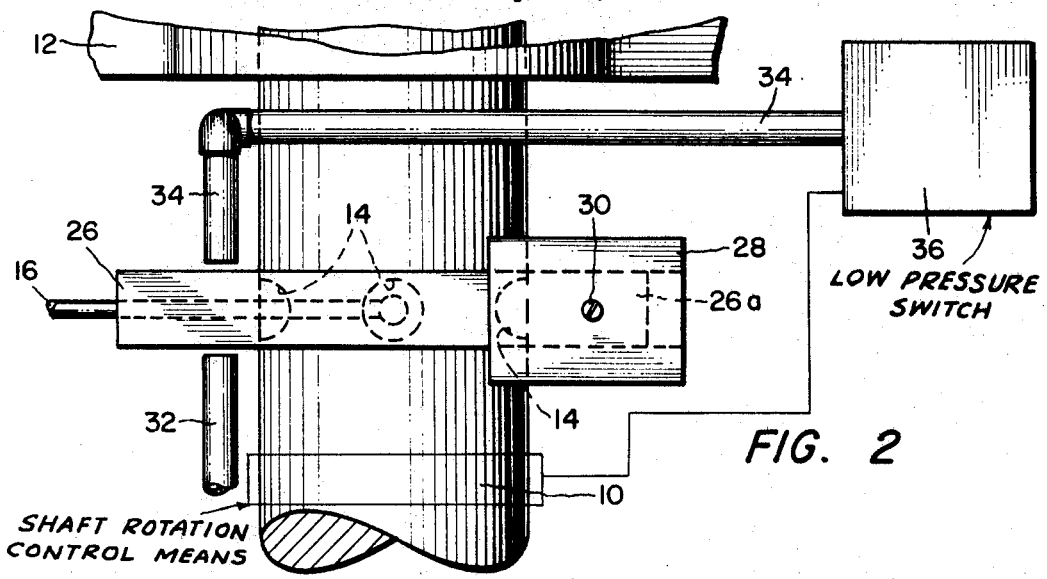
FIG. 2 is a top or plan view of the shaft and embodiment of the control apparatus shown in FIG. 1.
Figure 1:
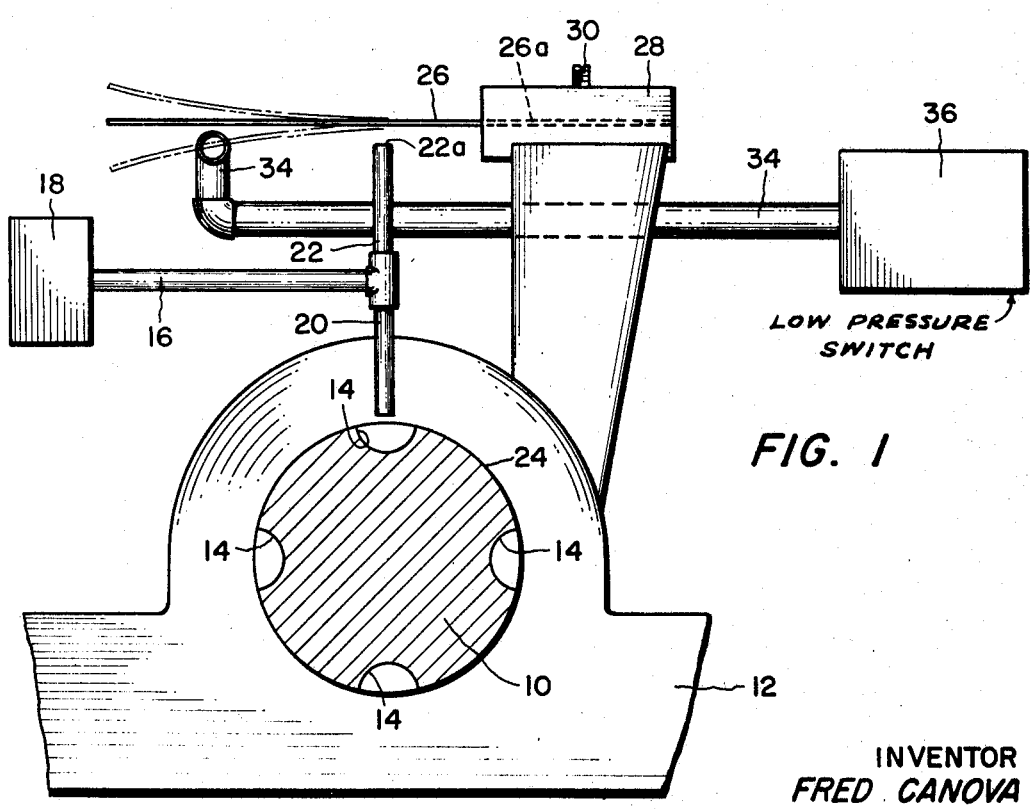
FIG. 1 is an elevational view of a rotating shaft shown in conjunction with an embodiment of the control apparatus provided by the present invention.

Referring more particularly to the drawings wherein similar reference characters designate corresponding parts throughout, FIGS. 1 and 2 illustrate a rotating element or shaft 10 which is rotatably journalled in a support 12 and rotatably driven in a conventional manner. The shaft 10 may be, for example, a part of a rotary pump, turbine, compressor, or the like. Alternatively, however, the shaft 10 may be otherwise employed for any suitable purpose; and it will be understood that, although illustrated and specifically described in conjunction with the rotating shaft 10, the control apparatus and method of the present invention are not limited to application with a rotary shaft but rather may be employed with other rotating elements.

The shaft 10 is provided with deformations spaced circumferentially therearound, these deformations being illustrated in FIG. 1 as four identical recesses 14 formed in the shaft 10 at equal intervals such that they are equally spaced around the shaft 10. Alternatively, however, the deformations could be of other suitable number and, rather than being formed directly in the shaft 10, could be formed in a collar affixed around the shaft 10.

The illustrated embodiment of the control apparatus comprises fluid supply means for directing pressurized fluid onto the recesses 14 and providing a pulsating fluid signal variable in frequency in response to variations in the rotary speed of the shaft 10. This fluid supply means includes a supply conduit 16 connected to receive a constant flow of pressurized fluid at constant pressure from a source or reservoir 18 which may be, for example, a plant air or bearing oil source. The supply conduit 16 supplies the constant pressure fluid to a pair of opposed, aligned conduits 20, 22, the conduit 20 being arranged to, in turn, direct fluid onto the recesses 14 from a stationary position there-adjacent. Thus, during the rotation of the shaft 10, the recesses 14 and lands 24 therebetween cooperate to cause variable fluid flow through the conduit 20 and resultantly cause the conduit 22 to discharge a pulsating fluid flow or fluid signal. This pulsating fluid signal discharged by the conduit 22, as will be seen, has a frequency dependent upon the rotary speed of the shaft 10 multiplied by the number of the recesses 14 and, hence, is variable in frequency in response to variations in the rotary speed of the shaft 10. Thus, this fluid signal provides a reliable indication of the rotary speed of the shaft 10.

An elongated, flexible reed 26 is arranged in the path of the fluid signal emitted from the conduit 22 and functions as an actuating element for causing the rotation of the shaft 10 to be stopped when the latter attains a predetermined rotary speed. The reed 26 is supported at one end 26a only and arranged such that intermediate its ends it extends over the discharge end 22a of the conduit 22 close to the discharge end 22a. The supported end 26a of the reed 26 is supported by a mounting 28 in which it is adjustably locked by a locking element 30. Hence, the effective length of the reed 26 (i.e.: the length of the portion of the reed 26 projecting from the mounting 28) is readily adjustable.

A pair of aligned, spaced, communicating conduits 32, 34 are arranged whereby, although the flow of fluid between the conduits 32, 34 is normally uninterrupted, the reed 26 will pass between the conduits 32, 34 to interrupt such flow upon a predetermined large amplitude of the reed 26. The conduit 32 is suitably connected to a conventional source (not shown) of pressurized fluid, such as compressed air, and due to this arrangement normally directs the fluid to the conduit 34. The conduit 34 is connected to supply the fluid to a conventional low pressure switch 36 (i.e.: a switch actuatable by a drop in fluid pressure) such as that manufactured by the Barksdale Company as No. D2H–H18SS, in turn, connected such that its actuation stops rotation of the shaft 10. Alternatively to this arrangement, however, the conduit 34 could be connected to supply its carried fluid to a coventional apparatus (not shown) suitable for automatically providing a visual or audio signal upon a pressure drop. In this latter event, of course, the apparatus providing the audio or visual signal would control the rotation of the shaft 10 in that it would guide the operator of the apparatus who would perform the actions necessitated by the audio or visual signal.

In the operation of the aforedescribed embodiment of the control apparatus, the reed 26 is first adjusted to cause the latter to have a natural frequency the same as the frequency of the fluid signal emitted from the conduit 22 at the predetermined rotary speed at which rotation of the shaft 10 is to be stopped. This adjustment is accomplished by varying the effective length of the reed 26 (i.e.: shortening such effective length to increase the natural frequency, lengthening the effective length to decrease the natural frequency) until the desired frequency is attained. This adjustment, as will be noted, may even be accomplished during the rotation of the shaft 10.

Thereafter, throughout the subsequent rotation of the shaft 10, pressurized fluid is supplied through the supply conduit 16 and conduit 20 to the recesses 14 to cause the conduit 22 to provide a fluid signal variable in frequency with variations in the rotary speed of the shaft 10. This fluid signal normally has only minimal effect on the reed 26 until the shaft 10 attains the predetermined rotary speed and the fluid signal attains the natural frequency of the reed 26. Thereupon, the fluid signal causes the reed 26 to vibrate through a large predetermined amplitude (shown in broken lines in FIG. 1) during which it passes between the conduits 32, 34 to interrupt fluid flow therebetween. This interruption of the fluid flow actuates the low pressure switch 36 to stop rotation of the shaft 10 or, in the event that the aforementioned visual or audio signaling apparatus be substituted for the pressure switch 36, controls the rotation of the shaft 10 by performing a guiding function.

From the preceding description it will be seen that I have provided a new and improved control apparatus which is both simple and compact in construction and, as there is no direct physical contact between the parts of the apparatus, which avoids the problems normally arising from wear and sparking. It will, moreover, be seen that my control apparatus does not require close manufacturing tolerances inasmuch as manufacturing accuracy is only of importance as regards the reed 26, but is readily and simply adjustable even during rotation of the rotating element it accompanies.

From the preceding description, it will also be seen that I have provided a new and improved method for controlling the rotary speed of a rotating element, comprising providing a fluid signal variable in frequency in response to variations in the rotary speed of the rotating element, directing the fluid signal onto an actuating element oscillatable by a predetermined frequency of the fluid signal through a predetermined amplitude, and employing the oscillation of the actuating element through such predetermined amplitude to control the rotary speed of the rotating element.

Having thus described my invention, I claim:

1. In combination with a rotating element provided with deformations spaced circumferentially therearound, a control apparatus comprising:

fluid supply means for directing pressurized fluid on said deformations and providing a pulsating fluid signal variable in frequency in response to variations in the rotary speed of said rotating element;

a flexible actuating element in the path of said fluid signal and oscillatable by a predetermined frequency of said fluid signal through a predetermined amplitude;

conduit means conveying pressurized fluid and arranged whereby, upon the oscillation of said actuating element through said predetermined amplitude, said actuating element intrefered with fluid flow through said conduit means; and means responsive to the interference of such fluid flow by said actuating element for stopping rotation of said rotating element.

2. A control apparatus according to claim 1, further comprising said actuating element being adjustable in effective length to permit adjustment of said predetermined frequency.

3. A control apparatus according to claim 1, further comprising said fluid supply means comprising a plurality of opposed conduits receiving fluid from a common source, one of said conduits being arranged at a stationary position adjacent said deformations and another thereof being arranged to provide said fluid signal to said actuating element.

4. A control apparatus according to claim 1, further comprising said fluid supply means including a pair of conduits connected to receive pressurized fluid from a third conduit conveying a constant flow of constant pressure fluid, one of said pair of conduits being arranged to direct fluid on said deformations from a constant position thereadjacent and the other thereof providing said fluid signal; said actuating element being supported at one end only; and said conduit means being a pair of aligned, spaced conduits arranged whereby, upon said predetermined amplitude of said actuating element moves intermediate such aligned conduits to interfere with fluid flow therebetween.

5. In combination with a rotating element provided with deformations spaced circumferentially therearound, a control apparatus comprising fluid supply means for directing pressurized fluid on said deformations and providing a pulsating fluid signal variable in frequency in response to variations in the rotary speed of said rotating element; an actuating element in the path of said fluid signal and oscillatable by a predetermined frequency of the latter through a predetermined amplitude; pressure operated controlling means actuatable for controlling the rotation of said rotating element; and conduit means for supplying pressurized fluid to said controlling means; said conduit means being arranged whereby, upon movement of said actuating element through said predetermined amplitude, said actuating element interferes with the flow of fluid through said conduit means to thereby actuate said controlling means.

6. A control apparatus according to claim 5, further comprising said actuating element being supported at one end only; and said conduit means including a pair of aligned, spaced conduits arranged whereby, upon said predetermined amplitude of said actuating element, said actuating element moves intermediate such conduits to interfere with fluid flow therebetween.

7. A control apparatus according to claim 5, further comprising said actuating element being axially movable for adjustment of its effective length.

8. The method of controlling the rotation of a rotating element provided with deformations spaced circumferentially therearound, comprising directing pressurized fluid onto said deformations to provide a pulsating fluid signal variable in frequency in response to variations in the rotary speed of said rotating element, directing said fluid signal onto an actuating element which is oscillatable through a predetermined amplitude by a predetermined frequency of said fluid signal, and employing the movement of said actuating element through said predetermined amplitude to interfere with fluid flow to a pressure operated controlling means whereby said controlling means is thereby actuated for control of said rotation.

9. The method according to claim 8, further comprising the step of adjusting the effective length of said actuating element to provide adjustment of the predetermined frequency of said fluid signal at which said actuating element oscillates through the predetermined amplitude.

References Cited

UNITED STATES PATENTS

| | | | |
|---|---|---|---|
| 2,646,814 | 7/1953 | Mueller | 137—82 XR |
| 2,900,468 | 8/1959 | Joy | 200—81.9 XR |
| 2,982,902 | 5/1961 | Le Gates | 318—481 |
| 3,042,767 | 7/1962 | Grostick | 200—83.51 XR |
| 3,109,948 | 11/1963 | Hellmann | 318—481 XR |
| 3,216,252 | 11/1965 | Chapman et al. | 73—232 XR |
| 3,260,456 | 7/1966 | Boothe | 137—81.5 XR |

MARK M. NEWMAN, Primary Examiner

A.D. HERRMANN, Assistant Examiner

U.S. Cl. X.R.

137—36, 37, 81.5; 192—147; 200—81.9, 83; 318—481